United States Patent [19]

Sakaguchi et al.

[11] Patent Number: 4,696,831
[45] Date of Patent: Sep. 29, 1987

[54] METHOD OF ORIENTING MAGNETIC DISC BY MAGNETIC FIELD

[75] Inventors: Isao Sakaguchi; Tatsuo Kawaide, both of Odawara, Japan

[73] Assignee: Hitachi, Ltd., Tokyo, Japan

[21] Appl. No.: 826,338

[22] Filed: Feb. 5, 1986

[30] Foreign Application Priority Data

Feb. 14, 1985 [JP] Japan .................... 60-26896

[51] Int. Cl.⁴ .......................... B05D 3/14; B05D 5/12
[52] U.S. Cl. ..................................... 427/48; 427/128; 427/130
[58] Field of Search .................. 427/48, 128, 129, 130

[56] References Cited

U.S. PATENT DOCUMENTS 4,189,508  2/1980  Chiba et al. ........................... 427/48

FOREIGN PATENT DOCUMENTS 54-9905   1/1979  Japan .................................... 427/48
54-11704  1/1979  Japan .................................... 427/48
1416200  12/1975  United Kingdom .................. 427/48

Primary Examiner—Thurman K. Page
Attorney, Agent, or Firm—Antonelli, Terry & Wands

[57] ABSTRACT

A method of orienting magnetic particles in the thin magnetic film of a magnetic disc in the circumferential direction of the magnetic disc is disclosed in which, in order to improve the magnetic squareness of the thin magnetic film and to eliminate the nonuniformity thereof, a magnetic field formed between a pair of magnetic poles which have the same polarity and disposed so as to be symmetrical with respect to the magnetic disc, is first applied to both surfaces of the magnetic disc immediately after the thin magnetic film has been formed on the magnetic disc, and then magnetic fields from magnetic poles of different polarity are alternately applied to the magnetic disc. In a modified version of this method, particle orientation is performed in the following manner. That is, in a period when the magnetic film is not yet dried, a magnetic field formed between magnetic poles which have the same polarity and are symmetrical with respect to the magnetic disc, is first applied to the magnetic disc, and then magnetic fields from magnetic poles of different polarity are alternately applied to the magnetic disc. Further, after the thin magnetic film has been dried, a magnetic field formed between magnetic poles which have the same polarity and are symmetrical with respect to the magnetic disc, is again applied to the magnetic disc.

8 Claims, 12 Drawing Figures

METHOD OF ORIENTING MAGNETIC DISC BY MAGNETIC FIELD

BACKGROUND OF THE INVENTION

The present invention relates to a method of orienting the magnetic film of a magnetic disc, which is used in a magnetic disc memory device, by a magnetic field, and more particularly to a method of orienting the magnetic film of a magnetic disc by a magnetic field in such a manner that the surface of the magnetic film is made smooth and the magnetic squareness of the magnetic film is improved.

In order to achieve the large memory capacity required for a recent magnetic disc memory device, it is desirable to record a large number of data bits on a magnetic disc at a high recording density. In order to realize the high density recording, it is necessary to form a thin, uniform magnetic layer on the magnetic disc and to make the surface of the magnetic layer smooth. The thin magnetic layer has an advantage such that a signal reproduced from the magnetic layer has a high resolution, but has a disadvantage such that the output level of the reproduced signal is lowered. In order to prevent the lowering in the output level of the reproduced signal, it is necessary to improve the orientation ratio of magnetic particles contained in the magnetic layer. The magnetic layer of a magnetic disc is formed of a resin which contains magnetic particles having magnetic poles. The above-mentioned lowering in the output level of the reproduced signal can be prevented by orienting almost all of the magnetic particles in a desired direction. The technique for orienting magnetic particles on a magnetic disc in a desired direction is called "particle orientation by magnetic field", and it is expressed by the orientation ratio how many magnetic particles on the magnetic disc have been oriented in the desired direction.

The particle orientation for a magnetic disc is carried out in the fabrication process of the magnetic disc, and is usually performed immediately after a thin magnetic film (that is, a magnetic layer) is formed on the surface of the magnetic disc. This is because since, immediately after the thin magnetic film has been formed, a solvent contained in the thin magnetic film has not been evaporated yet with the film having a low viscosity, magnetic particles can be readily oriented in a desired direction by an applied magnetic field, and the solvent is more and more evaporated with a lapse of time with the film having a higher viscosity to finally fix the orientation of each magnetic particle.

Now, conventional methods of orienting the magnetic film of a magnetic disc will be explained below, by reference to FIGS. 3A, 3B, 4A and 4B. In these figures, reference numeral 1 designates a magnetic disc in a state immediately after a thin magnetic film has been formed on the magnetic disc, and 3a, 3b, 4a and 4b magnets.

FIG. 3A is a plan view for explaining a conventional method of orienting the magnetic film of a magnetic disc, and FIG. 3B is a sectional view taken along the line IIIB—IIIB of FIG. 3A. Referring to FIGS. 3A and 3B, a pair of magnets 3a and 3b and another pair of magnets 4a and 4b are disposed on the side of one surface of the magnetic disc 1, and a thin magnetic film 1a is provided on the other surface, so that a horizontal magnetic field is applied to the magnetic disc almost in its circumferential direction by the magnets polarized in a direction perpendicular to the disc surface. When the magnetic disc is rotated in the above state, magnetic particles in the thin magnetic film are oriented substantially in the circumferential direction of the disc. However, since the horizontal magnetic field is applied to the magnetic disc by the magnets disposed on the rear side of the disc, the magnetic particles are actuated only vertically at a portion of the film on the disc right under the magnets, as shown in FIG. 3B. Accordingly, it is impossible to improve the unevenness roughness of the surface of the thin magnetic film sufficiently. Further, a considerable number of defects may be left within the thin magnetic film. In order to solve the above problems, another method of orienting the magnetic film of a magnetic disc has been proposed. FIG. 4A is a plan view for explaining this method, and FIG. 4B is a sectional view taken along the line IVB—IVB of FIG. 4A. Referring to FIGS. 4A and 4B, a pair of magnets 3a and 3b are disposed on the upper side of the magnetic disc 1 so as to have the polarity configuration shown in these figures, and another pair of magnets 4a and 4b are disposed on the lower side of the magnetic disc 1 so as to have the polarity configuration shown in the figures. The magnetic disc 1 is rotated with a horizontal magnetic field applied to the disc from each magnet pair in the circumferential direction. When the magnetic disc is rotated under the above-mentioned conditions, a horizontal magnetic field due to the magnets 3a and 3b and another horizontal magnetic field due to the magnets 4a and 4b are alternately applied to each part of a thin magnetic film 1a formed just now on the magnetic disc 1, and thus magnetic particles in the magnetic film 1a are oriented in the circumferential direction of the magnetic disc 1. At the same time, the magnetic particles are moved in upward and downward directions alternately, and thus are uniformly distributed in the thin magnetic film 1a. In the above method, however, two kinds of horizontal magnetic fields are alternately applied to the thin magnetic film, and hence the orientation efficiency of the magnetic film is not high. Thus, the magnetic squareness of the magnetic film would be about 0.8 at most, even if the number of magnets used were increased or the polarity of some of the magnets 3a, 3b, 4a and 4b were reversed. Further, in a different method of orienting the magnetic film of a magnetic disc by arranging a pair of magnets in such a manner that the magnetic disc is interposed between the magnets and similar magnetic poles of the magnets face each other (that is, a repulsive force is generated between the magnets), the magnetic squareness of the magnetic film can be increased to about 0.9, but magnetic particles in the magnetic film are gathered and nonuniformly, distributed so that the aluminum substrate of the magnetic disc is locally exposed, that is, the nonuniformity of the magnetic film is caused by the applied magnetic field. The above method is disclosed in Japanese patent unexamined publication No. 58-130444.

SUMMARY OF THE INVENTION

An object of the present invention is to provide a method of orienting the magnetic film of a magnetic disc which can improve the magnetic squareness of the magnetic film.

Another object of the present invention is to provide a method of orienting the magnetic film of a magnetic disc which can improve the magnetic squareness of the magnetic film, eliminate the nonuniformity of the magnetic film due to an applied magnetic field, and make the surface of the magnetic film smooth, thereby eliminating possible bit errors.

In order to attain the above objects, according to an aspect of the present invention, particle orientation is performed in such a manner that immediately after a magnetic film is formed on a magnetic disc, a magnetic field due to the repulsive arrangement of magnets is applied to both surfaces of the magnetic disc and then two kinds of magnetic fields are alternately applied to the magnetic disc. Further, according to another aspect of the present invention, particle orientation is performed in the following manner. That is, before a magnetic film formed on a magnetic disc is hardened, the particle orientation using a magnetic field due to the repulsive arrangement of magnets and the particle orientation using two kinds of magnetic fields alternately, are alternately performed. Further, after the magnetic film has been hardened, only the particle orientation using a magnetic field due to the repulsive arrangement of magnets is again carried out.

DESCRIPTION OF THE PREFERRED EMBODIMENT

An embodiment of a method of orienting the magnetic film of a magnetic disc in accordance with the present invention will be explained below in detail, by reference to the drawings.

Figure 1A:
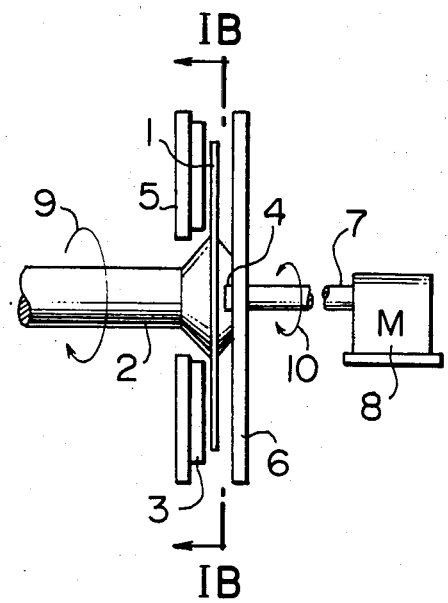
FIG. 1A is a side view showing a particle orientation processor for carrying out a method of orienting the magnetic film of a magnetic disc in accordance with the present invention.
Figure 1B:
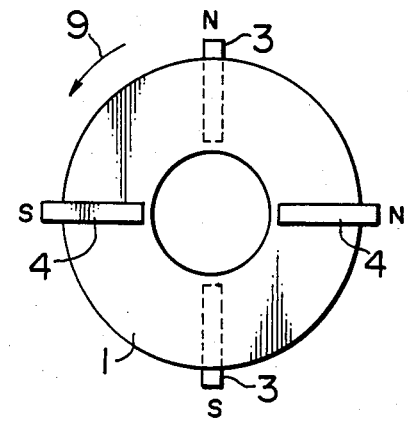
FIG. 1B is a sectional view taken along line IB—IB of FIG. 1A.

FIG. 1A is a side view showing a particle orientation processor for carrying out the above embodiment, and FIG. 1B is a sectional view taken along line IB—IB of FIG. 1A.

In FIGS. 1A and 1B, reference numeral 1 designates a magnetic disc immediately after a thin magnetic film has been formed thereon, 2 a spindle for holding and rotating the magnetic disc 1, 3 and 4 magnet pairs disposed at right angles with each other, for performing particle orientation, 5 a plate for holding the magnet pair 3, 6 a plate for holding the magnet pair 4, 7 a shaft, 8 a motor for rotating the plate 6, and 9 the rotational direction of the magnetic disc 1.

Referring to FIG. 1A, after magnetic material paint has been applied to the magnetic disc 1 at an application station (not shown), the magnetic disc 1 mounted on the spindle 2 is placed in an orientation station without drying the magnetic material paint. Then, the spindle 2 is rotated at a predetermined rotational speed. Further, the plates 5 and 6 which hold the magnet pairs 3 and 4, respectively, are moved toward the magnetic disc 1 while making rotational motions, and are stopped when each of the plates 5 and 6 reach a position which is spaced apart from the magnetic material paint on the magnetic disc 1 by a predetermined distance. The plate 6 is coupled with the motor 8 through the shaft 7, so as to be rotated coaxially with the spindle 2. When the shaft 7 is rotated in a direction indicated with an arrow 10 in the course of particle orientation, the angle between the magnet pair 3 and the magnet pair 4 is varied.

Figure 2A:
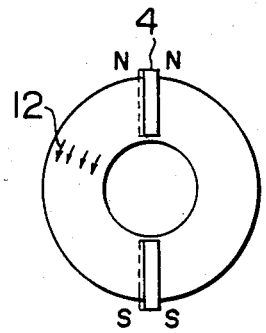
FIGS. 2A to 2C are sectional views for explaining the operation of the particle orientation processor of FIG. 1A.
Figure 2B:
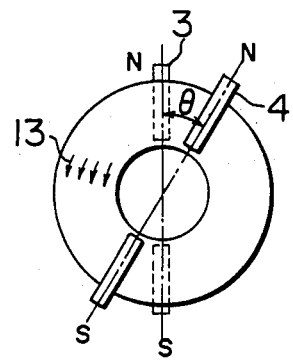
Figure 2C:
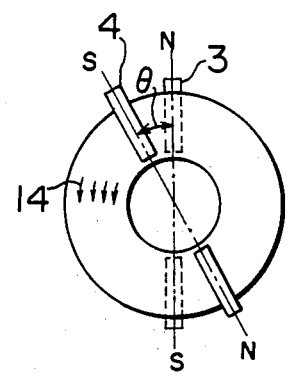
Figure 2D:
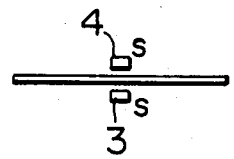
FIG. 2D is a side view corresponding to FIG. 2A.
Figure 3A:
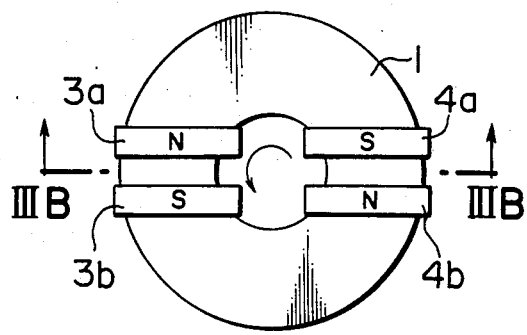
FIGS. 3A and 3B are views for explaining a conventional method of orienting the magnetic film of a magnetic disc.
Figure 3B:
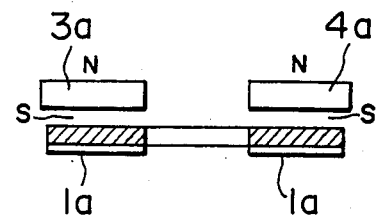
Figure 4A:
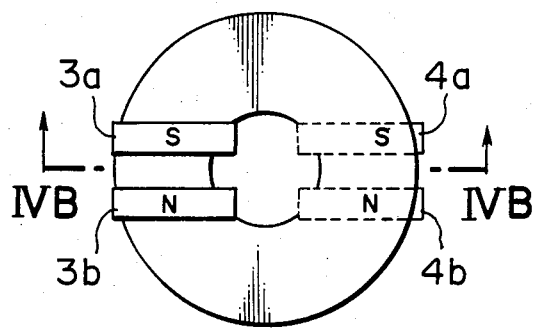
FIGS. 4A and 4B are views for explaining another conventional method of orienting the magnetic film of a magnetic disc.
Figure 4B:
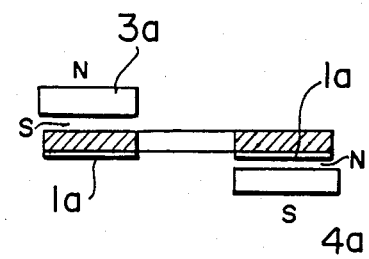

FIGS. 2A to 2D show various arrangements of the magnet pairs 3 and 4. As shown in these figures, the angle between the magnet pair 3 and the magnet pair 4 can take various values by rotating the plate 6. The nonuniformity of the magnetic material paint due to magnetic field can be improved by using the arrangements of magnet pairs shown in FIGS. 2A to 2C. FIG. 2A shows a case where particle orientation is performed by using a magnetic field due to the repulsive arrangement of magnets. FIGS. 2B and 2C show a case where particle orientation is carried out in such a manner that a magnetic field due to one of magnets which are disposed so as to form an angle $\theta$ therebetween, and a magnetic field due to the other magnet are alternately applied to each part of the magnetic material paint. It is to be noted that the angle $\theta$ in FIGS. 2B and 2C indicates given rotational positions of the plate 6 in the course of the rotation thereof. As the magnetic material paint which was applied to the magnetic disc 1 at the application station, becomes dry, the viscosity of the magnetic material paint increases. In more detail, the viscosity of the magnetic material paint (namely, the magnetic film) increases at a substantially constant speed. If the plate 6 is rotated while taking the viscosity of the magnetic film into consideration, the angle between the magnet pair 3 and the magnet pair 4 can be continuously varied without damaging the orientation of each magnetic particle in the circumferential direction of the magnetic disc 1 such as indicated by arrows 12, 13 and 14 in FIGS. 2A to 2C. An embodiment of a method of orienting the magnetic film of a magnetic disc in accordance with the present invention will be explained, by reference to FIGS. 2A to 2D. At the beginning of particle orientation, the magnet pairs 3 and 4 are disposed so that magnetic poles of the same polarity face each other through the magnetic disc 1, as shown in FIGS. 2A and 2D. (Incidentally, FIG. 2D is a side view corresponding to FIG. 2A). Thus, magnetic particles in the magnetic film are strongly oriented in the circumferential direction of the disc 1. Thereafter, the magnet pairs 3 and 4 are arranged so as to form an angle therebetween, as shown in FIGS. 2B and 2C, and thus a magnetic field due to the magnet pair 3 and a magnet field due to the magnet pair 4 are alternately applied to each part of the magnetic film, to improve the nonuniformity of the magnetic film caused by the particle orientation using the magnet arrangement of FIGS. 2A and 2D. Before the magnetic film (namely, the magnetic material paint) is dry, a magnetic field due to the repulsive arrangement of the magnet pairs 3 and 4 shown in FIGS. 2A and 2D is first applied to the magnetic film, and then the magnet pairs 3 and 4 are arranged as shown in FIGS. 2B and 2C so that a magnetic field due to the magnet pair 3 and a magnetic field due to the magnet pair 4 are alternately applied to each part of the magnetic film. Further, when the magnetic film becomes dry, the particle ornentation using a magnetic field due to the repulsive arrangement of the magnet pairs 3 and 4 shown in FIGS. 2A and 2D is again carried out, because there is no fear of the magnetic film being made nonuniform by the magnetic field. The above orientation processing can be modified, when the motor 8 is operated under a computer with a motor control program, by altering the program.

In the present embodiment, the magnet pairs 3 and 4 are first arranged so that the magnetic poles of the same polarity face each other through the magnetic disc 1, and then the angle between the magnet pair 3 and the magnet pair 4 is continuously varied in accordance with the viscosity of the magnetic film, to perform ideal orientation processing, thereby eliminating the nonuniformity of the magnet film and improving the magnetic squareness thereof.

Next, explanation will be made of the reason why the present embodiment can eliminate the nonuniformity of the magnetic film due to magnetic field and improve the magnetic squareness of the magnetic film.

Figure 5:
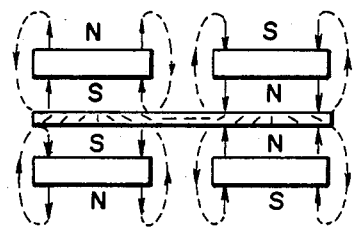
FIGS. 5 and 6 are schematic views for explaining the fundamental operation of the present invention.
Figure 6:
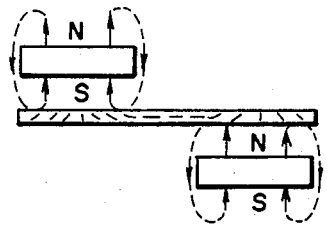

FIGS. 5 and 6 are schematic views for explaining the particle orientation using two kinds of magnetic fields alternately, and the particle orientation using a magnetic field due to the repulsive arrangement of two magnet pairs. In the particle orientation using two kinds of magnetic fields alternately, as shown in FIG. 6, two magnets are disposed on both sides of a magnetic disc so as to form an angle between the magnets, and the magnetic disc is rotated under these conditions. Accordingly, two kinds of magnetic fields due to the two magnets are alternately applied to magnetic particles in the magnetic film of the disc, and thus the polarity of each magnetic particle is reversed at a predetermined time interval. Whenever the polarity of a magnetic particle in the magnetic film is reversed, the magnetic particle stands up vertically, and is then oriented in a horizontal direction opposite to an original direction. Accordingly, when the above magnetic fields are alternately applied to the magnetic film, the surface of the magnetic film becomes smooth due to repetition of ON/OFF periods of orientation of particles in the film. However, the magnetic fields are relatively weak, and hence the magnetic squareness of the magnetic film is about 0.8.

Meanwhile, in the particle orientation using a magnetic field due to the repulsive arrangement of two magnet pairs shown in FIG. 5, magnet pairs are arranged in such a manner that the magnetic disc is interposed between the magnet pairs and the magnetic poles of the same polarity face each other, and hence each magnetic particle in the magnetic film is oriented in the circumferential direction of the magnetic disc without standing up vertically so many times. Accordingly, the magnetic particles in the magnetic film are readily gathered into clusters in a period in which the magnetic film is not yet dried, and thus the so-called nonuniformity of the magnetic film occurs. However, the magnetic field due to the repulsive arrangement of the magnet pairs is very strong, and hence the magnetic squareness of the magnetic film is as high as 0.9. The time necessary for drying the magnetic film is about two or three minutes. The degree of nonuniformity of the magnetic film caused by a magnetic field due to the repulsive arrangement of magnet pairs varies depending on the initial viscosity of the magnetic film. The initial viscosity of a magnetic film depends upon the ratio of the resin content to the magnetic particle content (for example, the iron powder content). The initial viscosity of magnetic films which are usually used, takes one of two or three values. Accordingly, the nonuniformity of magnetic film occurring in a drying period can be classified into two or three ranks in accordance with the initial viscosity of the magnetic film. According to the present invention, the processing for correcting the nonuniformity of the magnetic film is carried out in accordance with the rank of the nonuniformity. In more detail, in the nonuniformity correcting method according to the present invention, the particle orientation using a magnetic field due to the repulsive arrangement of magnet pairs (or magnets) is performed for magnetic material paint (namely, a magnetic film) immediately after the magnetic material paint has been applied to a magnetic disc, and then two kinds of magnetic fields are alternately applied to the magnetic film in accordance with the rank of the nonuniformity of the magnetic material paint, that is, in accordance with a program which indicates appropriate processing for each rank of ununiformity. In a case where the magnetic flux in the magnetic material paint (namely, the magnetic film) is concentrated in an angle, depending upon the initial viscosity of the magnetic film, or in a case where the nonuniformity of the magnetic film occurs within a range, the magnets having the repulsive arrangement are placed in the above angle or range, to perform the particle orientation using a magnetic field due to the repulsive arrangement of magnets, and then the particle orientation using two kinds of magnetic fields alternately, is carried out. Further, in a case where the concentration of magnetic flux occurs only at the beginning of the drying period, or in a case where the nonuniformity occurs in a large area of the magnetic film, the particle orientation using a magnetic field due to the repulsive arrangement of magnets is performed in a short time, and then the particle orientation using two kinds of magnetic fields alternately is performed for a long time while rotating one of the magnets continuously. As mentioned above, in a drying period when the nonuniformity of the magnetic film readily occurs, the particle orientation using a magnetic field due to the repulsive arrangement of two magnets is first carried out, and then two kinds of magnetic fields are alternately applied to the magnetic film, to eliminate the nonuniformity of the magnetic film. When the magnetic film is completely dry, the particle orientation using the repulsive arrangement of the magnets is again performed, to surely orient magnetic particles in the magnetic film in the circumferential direction of the magnetic disc. Further, according to the present invention, in the particle orientation using two kinds of magnetic fields alternately, one of two magnets for generating the magnetic fields is fixed, and the other magnet is made rotatable, in order to be able to vary the angle between the magnets continuously. In more detail, a pair of plates each provided with a magnet are arranged on both sides of a magnetic disc so that the magnetic disc is interposed between the plates. One of the plates is fixed, and the other plate can rotate coaxially with the magnetic disc. A motor for rotating the other plate is operated by a program so that the other plate can be stopped at various rotational positions and the angle between the magnets is set in accordance with the degree of dryness of a magnetic film. Further, the motor can be operated by another program so that the other plate is rotated clockwise and anticlockwise alternately, if necessary.

According to the present embodiment, the magnetic squareness B of magnetic film becomes larger, as compared with that obtained by the prior art (that is, the magnetic squareness B is given by a relation $0.9 \leq B < 1$), and moreover a uniform magnetic film having a smooth surface can be formed.

As has been explained in the foregoing, according to the present invention, the magnetic squareness of magnetic film can be made greater than 0.9, and hence a thin magnetic film can be used. Further, a motor for rotating a magnet is operated by a program so that a magnetic film having been subjected to particle orientation takes an optimum state. That is, the motor is operated in accordance with the material of the magnetic film.

We claim:

1. A method of orienting magnetic particles in the thin magnetic film of a magnetic disc in the circumferential direction of the magnetic disc by applying a horizontal magnetic field to the magnetic disc in the circumferential direction thereof immediately after the thin magnetic film has been formed on the magnetic disc, said method comprising:
   a first step of performing particle orientation in such a manner that a magnetic field formed between a pair of magnetic poles which have the same polarity and are disposed so as to be substantially symmetrical with respect to a magnetic disc, is applied to both surfaces of said magnetic disc; and
   a second step of performing particle orientation in such a manner that a magnetic field due to a magnetic pole of a first polarity and a magnetic field due to a magnetic pole of a second polarity are alternately applied to at least one surface of said magnetic disc which has been subjected to particle orientation by said first step.

2. A method according to claim 1, wherein in said first step, a pair of magnets are disposed on both sides of said magnetic disc so that said magnetic disc is interposed between said magnets and similar magnetic poles of said magnets face each other, to perform the particle orientation, and wherein in said second step, the particle orientation is performed in a state that at least one of said magnets is rotated about the center axis of said magnetic disc so that a magnetic field generated by said one magnet is prevented from intersecting with a magnetic field generated by the other magnet.

3. A method according to claim 2, wherein in said second step, the magnet disposed on the side of one surface of said magnetic disc is fixed, and the particle orientation is performed while rotating the magnet which is disposed on the side of the other surface of said magnetic disc, about the center axis of said maganetic disc.

4. A method according to claim 3, wherein in said second step, the particle orientation is performed while rotating the magnet which is disposed on the side of the other surface of said magnetic disc, clockwise and counterclockwise alternately.

5. A method of orienting magnetic particles in the thin magnetic film of a magnetic disc in the circumferential direction of the magnetic disc by applying a horizontal magnetic field to the magnetic disc in the circumferential direction thereof immediately after the thin magnetic film has been formed on the magnetic disc, said method comprising:
   a first step of performing particle orientation in a period when the thin magnetic film of a magnetic disc is not yet dried, in such a manner that a magnetic field formed between a pair of magnetic poles which have the same polarity and are disposed so as to be substantially symmetrical with respect to said magnetic disc, is applied to both surfaces of said magnetic disc;
   a second step of performing particle orientation in the period when said thin magnetic film is not yet dried, in such a manner that a magnetic field due to a magnetic pole of a first polarity and a magnetic field due to a magnetic pole of a second polarity are alternately applied to at least one surface of said magnetic disc; and
   a third step of performing particle orientation after said thin magnetic film has been dried, in such a manner that a magnetic field formed between a pair of magnetic poles which have the same polarity and are disposed so as to be symmetrical with respect to said magnetic disc, is applied to both surfaces of said magnetic disc.

6. A method according to claim 5, wherein in said first and third steps, a pair of magnets are disposed on both sides of said magnetic disc so that said magnetic disc is interposed between said magnets and similar magnetic poles of said magnets face each other, to perform the particle orientation, and wherein in said second step, the particle orientation is performed in a state that at least one of said magnets is rotated about the center axis of said magnetic disc so that a magnetic field generated by said one magnet is prevented from intersecting with a magnetic field generated by the other magnet.

7. A method according to claim 6, wherein in said second step, the magnet disposed on the side of one surface of said magnetic disc is fixed, and the particle orientation is perfomed while rotating the magnet which is disposed on the side of the other surface of said magnetic disc, about the center axis of said magnetic disc.

8. A method according to claim 7, wherein in said second step, the particle orientation is performed while rotating the magnet which is disposed on the side of the other surface of said magnetic disc, clockwise and counterclockwise alternately.

* * * * *